US012806627B2

(12) United States Patent
Hoag et al.

(10) Patent No.: US 12,806,627 B2
(45) Date of Patent: Nov. 24, 2026

(54) PIVOTAL DOOR FOR ADJUSTING THE POSITION OF AND GAINING ACCESS TO A GRINDING ROLLER OF A PULVERIZER MILL

(71) Applicant: Schenck Process LLC, Kansas City, MO (US)

(72) Inventors: James Raymond Hoag, Kihei, HI (US); Felipe H. Giacomazzi, Tremembé (BR); Laszlo Ivan, Naperville, IL (US)

(73) Assignee: Coperion Process Solutions LLC, Kansas City, MO (US)

( * ) Notice: Subject to any disclaimer, the term of this patent is extended or adjusted under 35 U.S.C. 154(b) by 453 days.

(21) Appl. No.: 18/382,415

(22) Filed: Oct. 20, 2023

(65) Prior Publication Data

US 2024/0131525 A1 Apr. 25, 2024
US 2024/0226912 A9 Jul. 11, 2024

Related U.S. Application Data

(60) Provisional application No. 63/418,396, filed on Oct. 21, 2022.

(51) Int. Cl.

| | |
|---|---|
| ***B02C 23/00*** | (2006.01) |
| ***B02C 4/32*** | (2006.01) |
| ***E06B 3/38*** | (2006.01) |
| *E05F 17/00* | (2006.01) |

(52) U.S. Cl.

CPC ................ *B02C 23/00* (2013.01); *B02C 4/32* (2013.01); *E06B 3/38* (2013.01); *E05F 2017/008* (2013.01)

(58) Field of Classification Search

None

See application file for complete search history.

(56) References Cited

U.S. PATENT DOCUMENTS 10,823,428 B2 * 11/2020 Jadhav .................... E05D 15/46
2017/0312753 A1 * 11/2017 Colson ..................... B66D 1/36

FOREIGN PATENT DOCUMENTS

CN 2186110 Y * 12/1994
WO 2017186971 A1 11/2017
WO 2021065373 A1 4/2021

* cited by examiner

*Primary Examiner* — Vicky A Johnson
(74) *Attorney, Agent, or Firm* — Robinson & Cole LLP

(57) ABSTRACT

A split door assembly for a grinding mill includes an upper door assembly with an upper door exterior surface. The upper door exterior surface supports a journal actuator assembly and the upper door assembly is pivotal with a journal that has a grinding roller mounted thereon. The split door assembly includes a lower door positioned below the upper door assembly. A hinge assembly pivotally connects the upper door assembly and the lower door. The upper door assembly and the lower door are pivotable together between a closed position and an open position. When in the closed position, the upper door assembly abuts the lower door. When in the open position, the upper door assembly is pivoted away from the grinding mill, the lower door is pivoted away from the grinding mill and the lower door is pivoted relative to the upper door assembly.

14 Claims, 8 Drawing Sheets

PIVOTAL DOOR FOR ADJUSTING THE POSITION OF AND GAINING ACCESS TO A GRINDING ROLLER OF A PULVERIZER MILL

CROSS REFERENCE TO RELATED APPLICATION

The present application claims priority to commonly owned U.S. Provisional Application No. 63/418,396, filed Oct. 21, 2022, the contents of which are incorporated herein by reference in its entirety.

TECHNICAL FIELD

The present disclosure relates generally to a split door for access to an interior area of a grinding mill. The split door includes an upper door assembly and a lower door assembly, and a top mounted actuator attached to a lever configuration for pivoting the upper door assembly with a journal and grinding roller mounted thereon, towards and away from the grinding mill for providing access to the journal and grinding roller for maintenance purposes and for adjusting the position of the grinding roller relative to the grinding bowl.

BACKGROUND

Various types of grinding mills are typically employed to grind solid materials such as minerals, limestone, gypsum, phosphate rock, salt, coke, biomass and coal into small particles for use in a wide range of processes such as for combustion in furnaces and for chemical reactions in reactor systems. There are many types and configurations of grinding mills including ball mills, roller mills and bowl type vertical grinding mills. The ball mills typically include a horizontal rotating cylinder containing a charge of tumbling or cascading balls. The roller mills are sometimes referred to as pendulum mills which include a support shaft rotationally supported by a bearing housing. One end of the shaft is coupled to a drive unit for rotating the shaft. An opposing end of the shaft has a hub mounted thereto. A plurality of arms extend from the hub. Each of the arms pivotally supports a roller journal which has a roller rotatingly coupled to an end thereof. The rollers rollingly engage the grinding ring. During operation of the roller mill, centrifugal forces drive the crushing members against the grinding ring. The crushing members pulverize the solid material against the grinding ring as a result of contact with the grinding ring. Another type of grinding mill is a vertical grinding mill that has a grinding bowl rotatably mounted in a mill body or housing. The vertical grinding mill includes grinding rollers mounted on a journal. The grinding rollers are in proximity to the grinding bowl to pulverize material therebetween. After being pulverized, the particles of material are thrown outwardly by centrifugal force whereby the particles of material are fed into a stream of air that is entering the mill.

The grinding rollers tend to wear due to the abrasive rolling operation that they are subject to. Thus, the grinding rollers need to be removed from the mill and be replaced. The journal and the grinding rollers are a massive assembly that can weigh several thousand pounds or more. The weight and the somewhat cantilevered orientation of the journal and the grinding roller mounted thereon make it rather difficult to remove and install them in the mill.

Thus, there is a need for an improved access to and manipulation of the journal and grinding rollers that overcomes the foregoing problems.

SUMMARY

According to aspects illustrated herein, there is provided a split door assembly for a grinding mill. The split door assembly includes an upper door assembly that has an upper door exterior surface. The upper door exterior surface supports a journal actuator assembly. The upper door assembly is pivotal with a journal that has a grinding roller mounted thereon. The split door assembly includes a lower door positioned below the upper door assembly. A hinge assembly is pivotally connected to the upper door assembly and the lower door. The upper door assembly and the lower door are pivotable together between a closed position and an open position. When in the closed position, the upper door assembly abuts the lower door. When in the open position, the upper door assembly is pivoted away from the grinding mill, the lower door is pivoted away from the grinding mill and the lower door is pivoted relative to the upper door assembly.

In some embodiments, the hinge assembly includes a linkage arm that extends from a first pivotal connector to a mounting portion which is secured to the lower door. An upper door bracket is secured to the upper door assembly and has a second pivotal connector extending outwardly therefrom. The first pivotal connector is configured to pivot with the second pivotal connector at a pivot axis.

In some embodiments, a pin extends through the first pivotal connector and the second pivotal connector such that the first pivotal connector is pivotally connected to the second pivotal connector at the pivot axis.

In some embodiments, a shoulder extends from the first pivotal connector and a locking plate is secured to the first pivotal connector and/or the second pivotal connector. A lateral edge of the locking plate abuts the shoulder. The locking plate selectively controls a position of the linkage arm relative to the second pivotal connector.

In some embodiments, when the locking plate is removed from the first pivotal connector and the second pivotal connector, the lower door and the bracket are configured to pivot out until a combined center of gravity of the lower door and the bracket is vertically aligned with the pivot axis.

In some embodiments, when the locking plate is removed from the first pivotal connector and/or the second pivotal connector, a portion of the first pivotal connector is configured to engage the upper door bracket to limit pivoting of the lower door so that the lower door is prevented from engaging a trunnion cylinder secured to the exterior surface of the upper door assembly.

In some embodiments, a journal head is pivotally connected to a portion (e.g., wall extension) of the grinding mill. The journal head includes a shaft receiving hub that is aligned along a longitudinal axis. A trunnion shaft is secured in the hub and projects outwardly therefrom and into an eccentric trunnion bushing housing. The trunnion bushing housing has a flange that extends radially outward from an outboard end thereof. The flange is adjustably secured to the portion (i.e., the wall extension) of the grinding mill. A trunnion bushing is positioned in the trunnion bushing housing and the shaft is rotatably positioned in the trunnion bushing. A lever arm extends between a flange mounting end and a door mounting end thereof. A tab extends upwardly from the lever arm at a location between the flange mounting end and the door mounting end. The flange mounting end is secured to the flange. The door mounting end is secured to the upper door assembly. The lever arm is configured to open and close the upper door assembly and the lower door with the journal head and the grinding roller secured to the upper door assembly.

In some embodiments, an actuator (e.g., a linear actuator, a piston cylinder arrangement or the like) extends from an upper end to a lower end thereof. The upper end is pivotally connected to a mill wall located at a position above the upper door assembly. The lower end is pivotally connected to the tab of the lever arm. The actuator is configured to move the lever arm (e.g., rotate) to open and close the upper door assembly with the journal and grinding roller thereon and to open and close the lower door.

In some embodiments, a plurality of first fasteners secure the flange to the portion (e.g., mill wall extension) of the grinding mill. When the plurality of first fasteners are removed, the trunnion bushing housing is rotatable with respect to the portion of the grinding mill to change a position of the longitudinal axis of the journal head and the grinding roller.

In some embodiments, a plurality of second fasteners secure the lever arm to the flange. When the plurality of second fasteners are removed, the lever arm is in rotational sliding engagement with the flange to enable the upper door assembly to pivot towards or away from the grinding mill.

In some embodiments, when the upper door assembly is in a maximum open position, the journal is substantially vertical.

There is further disclosed herein, a mill door opening mechanism for a grinding mill. The door opening mechanism includes a door assembly configured to pivot with a journal that has a grinding roller mounted thereon. The door assembly is configured to be split into an upper door assembly and a lower door. The upper door assembly pivots with the journal that has the grinding roller mounted thereon. The journal is fixed to a journal head which is pivotally connected to a portion (e.g., mill extension wall) of the grinding mill. The journal head includes a shaft receiving hub that is aligned along a longitudinal axis thereof. A trunnion shaft is mounted in the hub and projects outwardly therefrom and into an eccentric trunnion bushing housing. The trunnion bushing housing has a flange extending radially outward from an outboard end thereof. The flange is adjustably secured to the portion of the grinding mill. A trunnion bushing is positioned in the trunnion bushing housing and the shaft is rotatably positioned in the trunnion bushing. A lever arm is fixed to the flange. A linear actuator is connected between the lever arm and a mill wall (i.e., a portion of the mill wall located above the upper door assembly) of the grinding mill. The linear actuator is configured to pivot the upper door assembly and the lower door together about the longitudinal axis and between a closed position and an open position.

There is further disclosed herein, a grinding roller adjustment mechanism for a grinding mill. The grinding roller adjustment mechanism includes an upper door assembly that has an upper door exterior surface. The grinding roller adjustment mechanism includes a journal that has a grinding roller mounted thereon. The journal is fixed to a journal head that is pivotally connected to a portion (e.g., wall extension) of the grinding mill. The journal head includes a shaft receiving hub that is aligned along a longitudinal axis thereof. A trunnion shaft is mounted in the hub and projects outwardly therefrom and into an eccentric trunnion bushing housing. The trunnion bushing housing has a flange that extends radially outward from an outboard end thereof. The flange is adjustably secured to the portion of the grinding mill. A trunnion bushing is positioned in the trunnion bushing housing and the shaft is rotatably positioned in the trunnion bushing. A lever arm is fixed to the flange. An actuator (e.g., linear actuator, piston cylinder arrangement of the like) is connected between the lever arm and a mill wall of the grinding mill. The actuator is configured to rotate the trunnion bushing housing to thereby change the position of the longitudinal axis while the upper door assembly is closed, to control the location of the grinding roller relative to a grinding ring disposed in the grinding mill.

Any of the foregoing embodiments may be combined.

BRIEF DESCRIPTION OF THE DRAWINGS

Referring now to the Figures, which are exemplary embodiments, and wherein the like elements are numbered alike.

DETAILED DESCRIPTION

Figure 7:
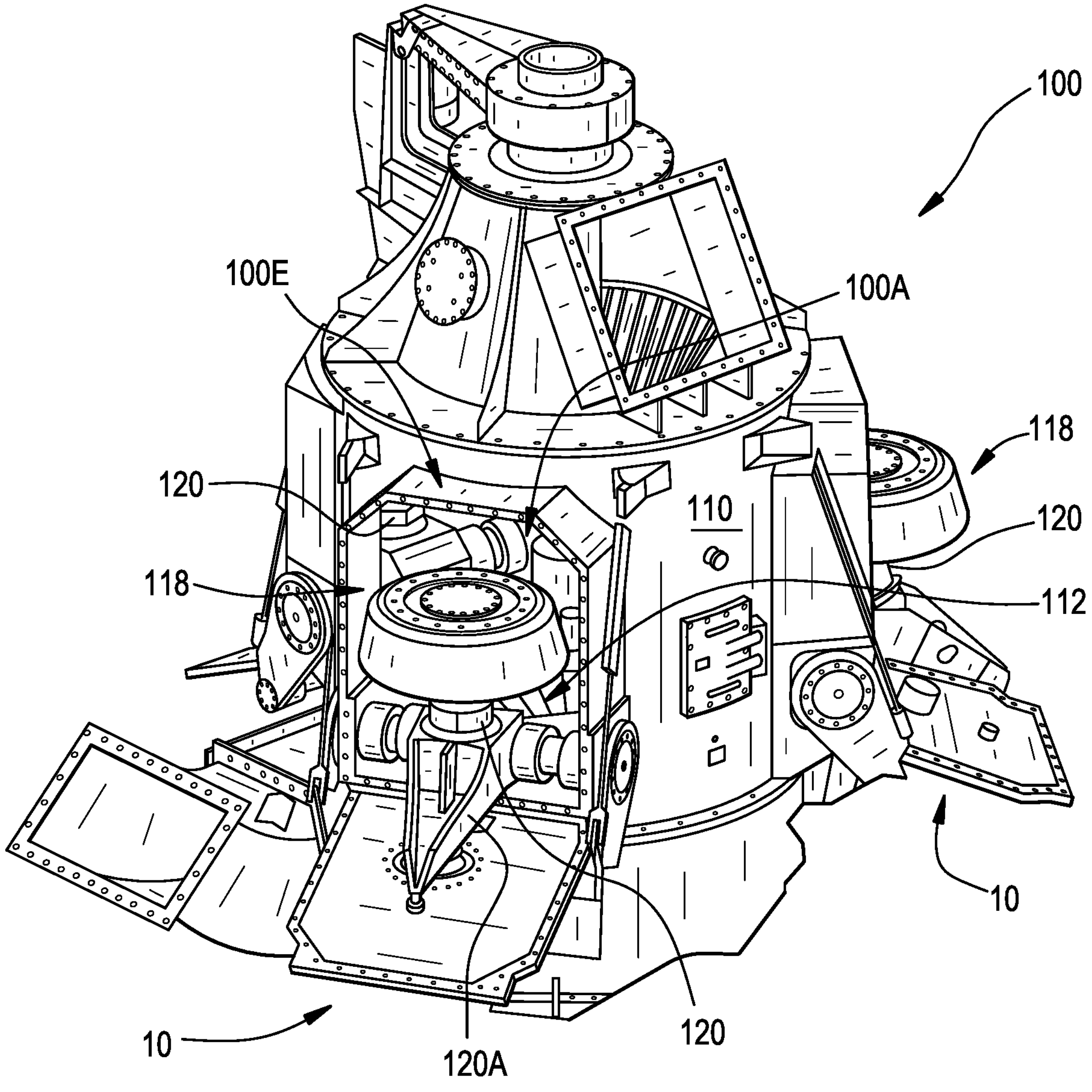
FIG. 7 is a partial perspective view of an upper portion of a vertical grinding mill.

As shown in FIG. 7, a vertical grinding mill is generally designated by the numeral 100. The grinding mill 100 has generally tubular wall 110 that defines an interior area 100A of the grinding mill 100. A grinding bowl 112 is rotatably mounted in the interior area 100A. The grinding mill 100 is shown with split door assemblies 10 in an open position which provides access to a journal 120 and a grinding roller 118 mounted thereon. There are three sets of journals 120 and grinding rollers 118, but only two of the grinding rollers 118 are shown.

Figure 1:
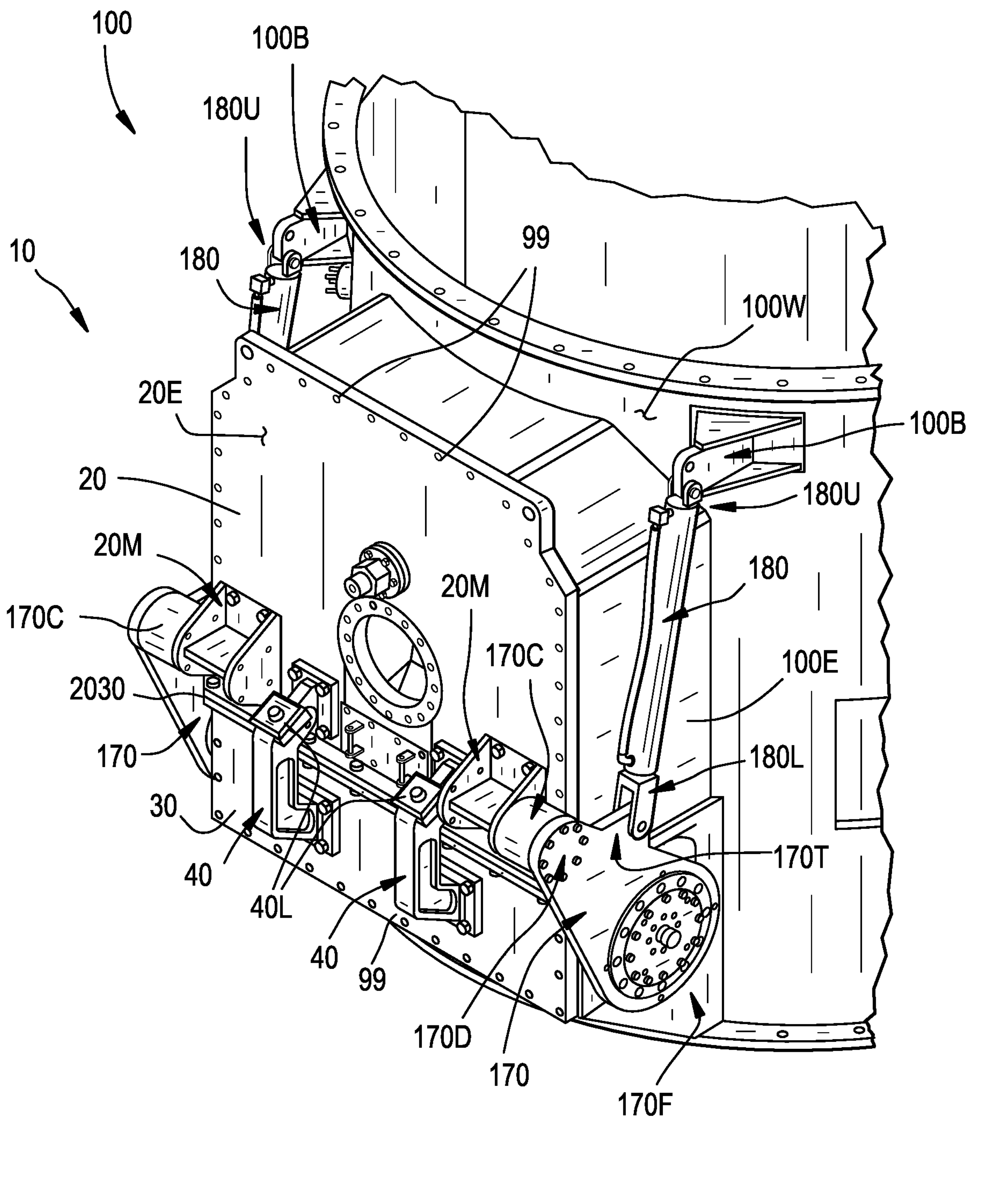
FIG. 1 is a perspective view of a portion of a grinding mill with a split door configuration of the present invention.
Figure 3:
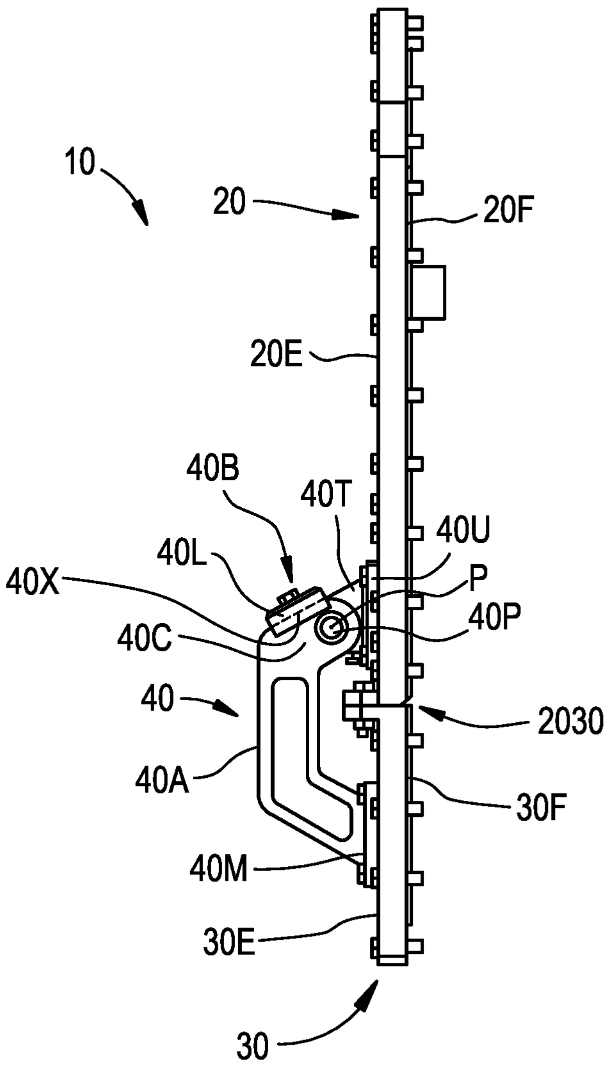
FIG. 3 is a side view of the split door of FIG. 1.

As shown in FIGS. 1 and 3, a portion of a grinding mill is generally designated by element number 100. The grinding mill 100 includes a split door assembly 10 of the present invention and preferably three split door assemblies 10. The grinding mill 100 and the split door assembly 10 are manufactured from a metallic material such as structural steel. The split door assembly 10 includes an upper door assembly 20 that has an upper door exterior surface 20E and an upper door interior surface 20F. The upper door exterior surface 20E is configured to support a journal actuator assembly 222 (see FIG. 6). The journal actuator assembly 222 is in communication with an extension arm 120A that extends from the journal 120. As shown in FIGS. 1 and 3, a lower door 30 is positioned below the upper door assembly 20 at a seam 2030. In the closed position and especially during operation of the grinding mill 100, the upper door assembly 20 and the lower door 30 are secured to a portion of the grinding mill 100 by a plurality of fasteners 99 (e.g., bolts). However, when it is desired to open the upper door assembly 20 and the lower door 30, the fasteners 99 are removed.

As shown in FIGS. 1 and 3, a hinge assembly 40 is pivotally connected to the upper door assembly 20 and the lower door 30. Thus, the upper door assembly 20 and the lower door 30 are pivotable together (e.g., as a jointed pair) between a closed position and an open position of the split door assembly 10, relative to the grinding mill 100. In other words, both the upper door assembly 20 and the lower door 30 can move independently of one another and at the same time during opening (i.e., moving away from the grinding mill 100) and closing (i.e., moving toward the grinding mill 100) operations.

Figure 6:
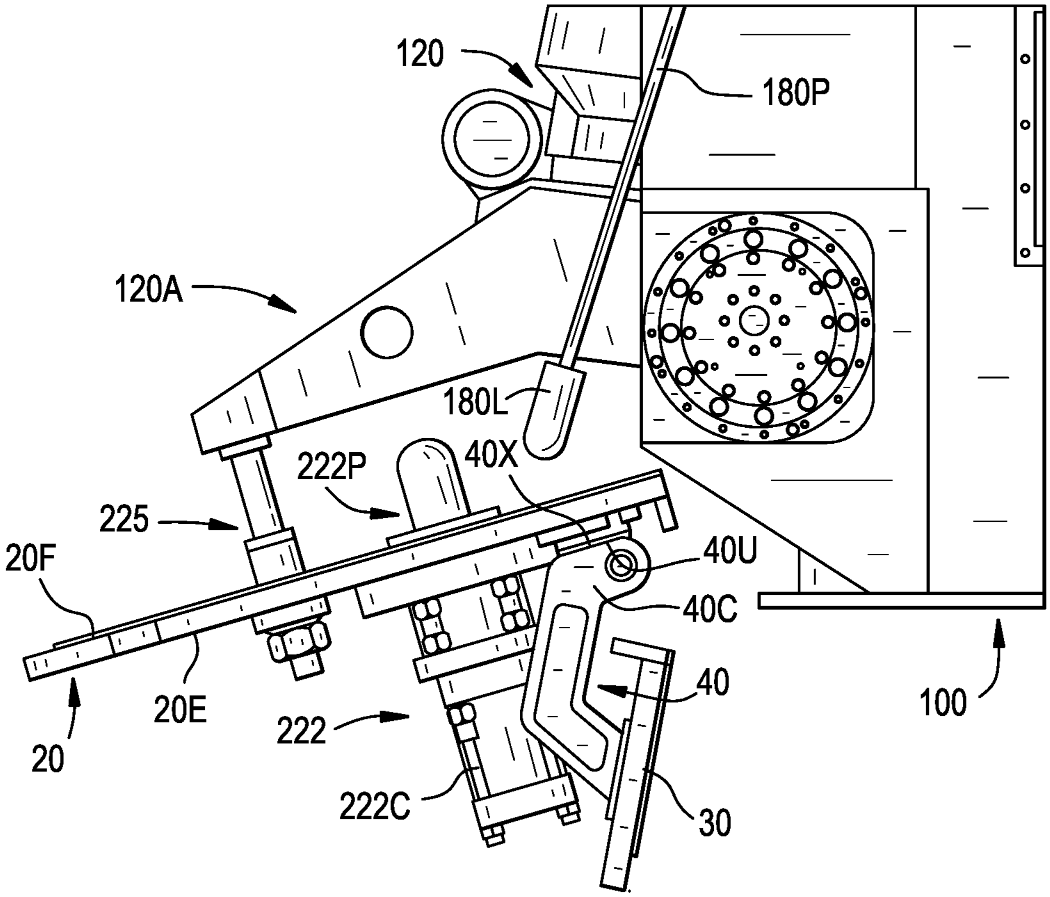
FIG. 6 is a side view of the split door configuration of FIG. 1 shown with the upper door assembly partially open and the lever arm removed for clarity.

As shown in FIGS. 1 and 3, when in the closed position, the upper door assembly 20 abuts the lower door 30 at a seam 2030. As shown in FIG. 6, when in the open position, the upper door assembly 20 is pivoted away from the grinding mill 100, the lower door 30 is pivoted away from the grinding mill 100 and the lower door 30 is pivoted relative to the upper door assembly 20.

Figure 2:
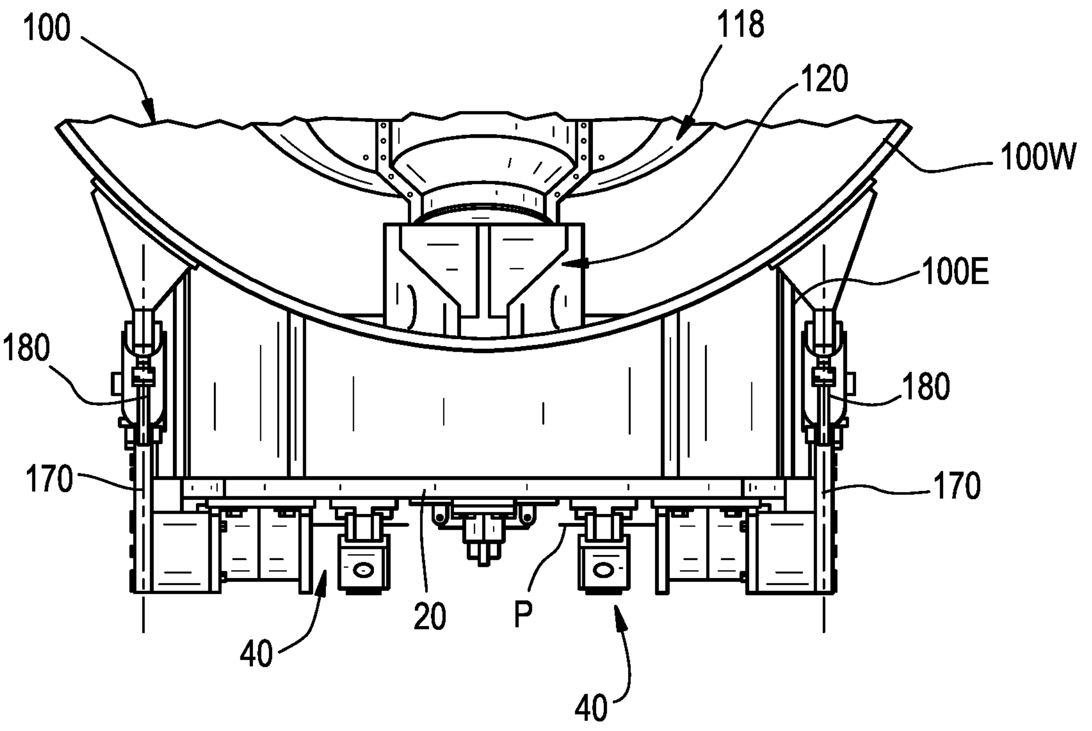
FIG. 2 is a top cross-sectional view of a portion of the grinding mill of FIG. 1.

As best shown in FIG. 3, the hinge assembly 40 includes a linkage arm 40A that extends, on the upper end thereof, from a first pivotal connector 40C to a mounting portion 40M (located at a lower end of the linkage arm 40A) that is secured to the lower door 30. In some embodiments, the first pivotal connector 40C includes a clevis. The first pivotal connector 40C has two parallel facing legs that are joined together at one end of the legs. Each of the legs has a bore (coaxial to each other) extending therethrough. An upper door bracket 40U is secured (e.g., bolted or welded) to a lower portion of the upper door 20 proximate the seam 2030. The upper door bracket 40U has a second pivotal connector 40T (e.g., a tang) that extends outwardly from the upper bracket 40U. The second pivotal connector 40T is positioned in the first pivotal connector 40C and has a bore extending therethrough that is coaxial with the bores in the first pivotal connector 40C. A pin 40P extends through the first pivotal connector 40C (i.e., through the bores in the first pivotal connector 40C) and the second pivotal connector 40T (i.e., through the bore in the second pivotal connector 40T). The pin 40P is press fit into the bores in the first pivotal connector 40C. The bore in the second pivotal connector 40T is oversized relative to the outside diameter of the pin 40P such that the first pivotal connector 40C is pivotally connected to the second pivotal connector 40T about a pivot axis P (see FIG. 2). That is, the first pivotal connector 40C is configured to pivot with the second pivotal connector 40T about a pivot axis P.

While the upper door bracket 40U is described as having the second pivotal connector 40T and the linkage arm 40A that terminates in the first pivotal connector 40C, the present invention is not limited in this regard as other pivotal connections may be employed including but not limited to a tang extending from the linkage arm 40A and a clevis extending from the upper door bracket 40U.

Figure 8:
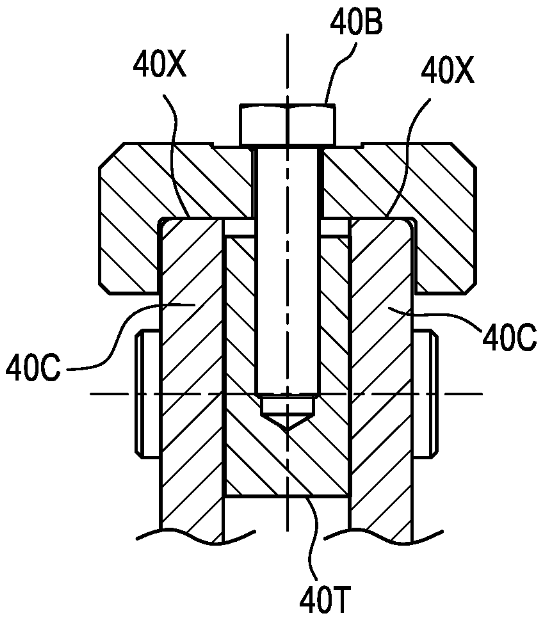
FIG. 8 is a front cross-sectional view of a portion of the locking plate, first pivotal connector and second pivotal connector of FIG. 3 shown in the fully secured position.
Figure 9:
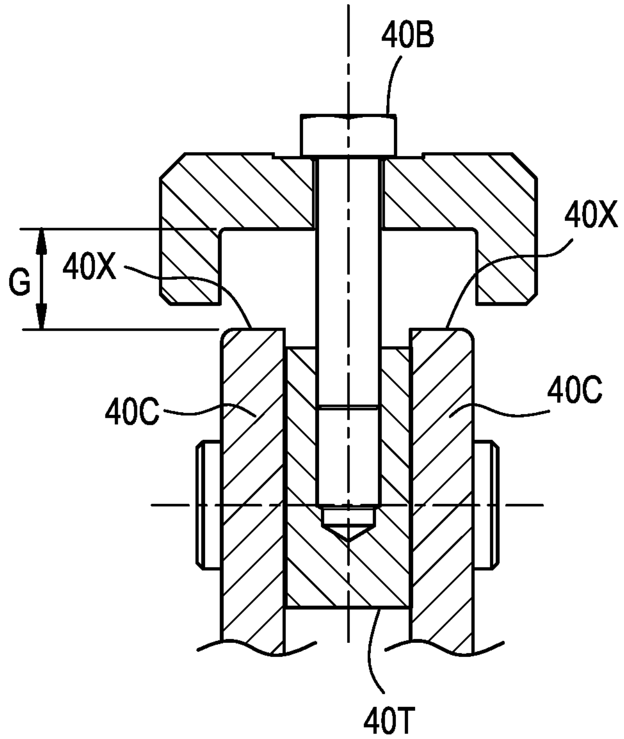
FIG. 9 is a front cross-sectional view of a portion of the locking plate, first pivotal connector and second pivotal connector of FIG. 3 shown in an intermediate loosened position.

As shown in FIG. 3, the hinge assembly 40 includes a shoulder 40X that extends from a base portion of the first pivotal connector 40C. A locking plate 40L is disposed on (e.g., removably secured to) an edge of the first pivotal connector 40C and on an edge of the second pivotal connector 40T. The locking plate 40L is removably secured to the second pivotal connector 40T by a fastener 40B (e.g., a bolt that is threaded into a female threaded bore that extends into an edge of the second pivotal connector 40T); and/or the locking plate 40L is secured to the first pivotal connector 40C by a fastener (e.g., a bolt that is threaded into a female threaded bore that extends into an edge of the first pivotal connector 40C). As best shown in FIG. 8, a lateral edge of the locking plate 40L abuts the shoulder 40X, thereby preventing relative movement of the first pivotal connector 40C relative to the second pivotal connector 40T, when the locking plate 40L is installed. Thus, the locking plate 40L prevents rotation of the lower door 30 when the bolts 99 are removed. The locking plate 40L selectively controls a position of the linkage arm 40A relative to the second pivotal connector 40T, by incrementally adjusting the position of the fastener 40B in the female threaded bore, as shown in FIG. 9 with the fastener 40B loosened. As shown in FIG. 9, when the fastener 40B is loosened but not fully removed from the female thread, an inside surface of the locking plate 40L is spaced apart from the shoulder 40X by a gap G. For example, loosening and/or removing the fastener 40B and removing the locking plate 40L allows the lower door 30 to swing away from the upper door assembly 20. When the locking plate 40L is removed, the lower door 30 and the bracket 40 pivot outwardly until a combined center of gravity of the lower door 30 and the bracket 40 is vertically aligned with the pin 40P (i.e., vertically aligned with the pivot axis P). Thus, when the upper door assembly 20 is pivoted relative to the grinding mill 100, the lower door 30 and the bracket 40 continue to pivot out and the combined center of gravity of the lower door 30 and the bracket 40 remains vertically aligned with the pin 40P.

As shown in FIG. 6, when the locking plate 40L is removed, a portion of the first pivotal connector 40C engages the upper door bracket 40U to limit pivoting of the lower door 30 so that the lower door 30 is prevented from engaging a trunnion cylinder 222C that is secured to the exterior surface 20E of the upper door assembly 20 when the upper door assembly 20 is opened to a predetermined position (e.g., close to fully open position with the journal 120 nearly vertical or in the fully open position with the journal 120 in the vertical position). The trunnion cylinder 222C includes a trunnion piston 222P which slides in the trunnion cylinder 222C. The trunnion piston 222P is configured to engage an extension arm 120A of the trunnion to urge the grinding roller 118 (shown in FIG. 2) toward the grinding bowl 112 (shown in FIG. 7) during operation of the grinding mill 100. The extension arm 120A has a slot formed on a distal end thereof and the slot is guided by a post 225 that extends from and is secured to the upper door assembly 20.

Figure 4:
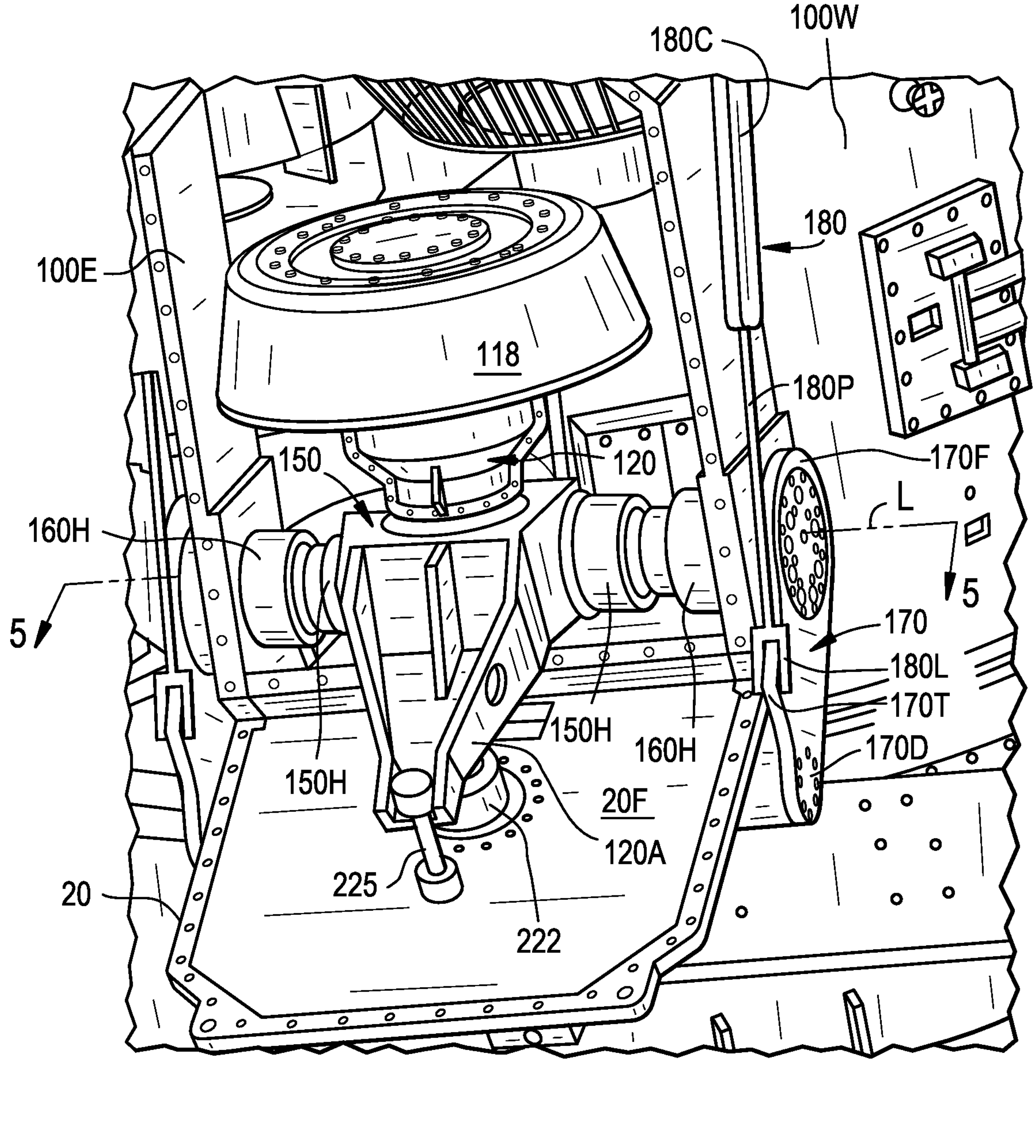
FIG. 4 is a perspective view of the grinding mill with the split door configuration of FIG. 3 shown in an open position with the journal in a vertical position.

As shown in FIG. 4, a journal head 150 is pivotally connected to a portion 100E of the grinding mill 100, for example, a vertical wall of an extension box attached to an opening in the grinding mill 100. The journal head 150 includes two opposite facing shaft receiving hubs 150H that are aligned along a longitudinal axis L of the journal head 150.

Figure 5:
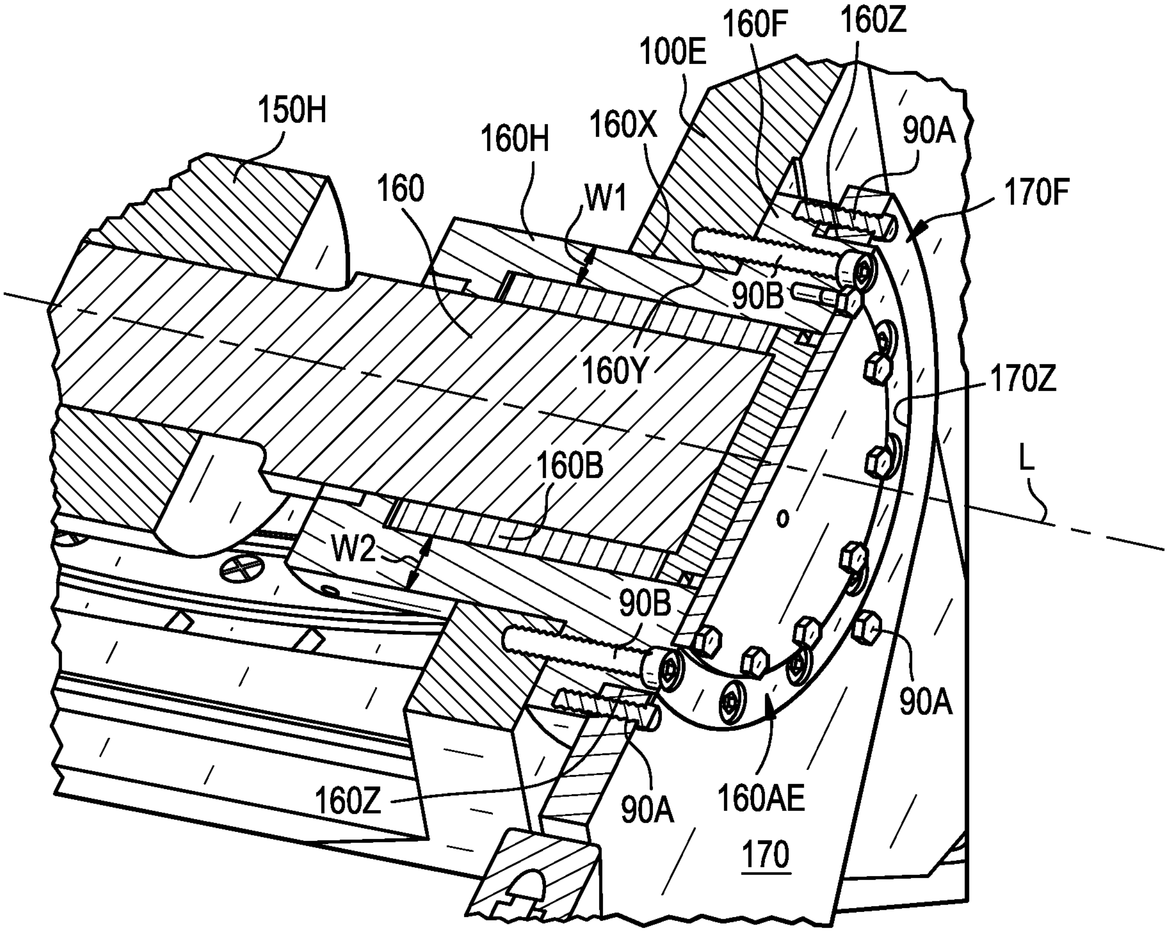
FIG. 5 is a cross-sectional view of a portion of the grinding mill taken across section 5-5 of FIG. 4.

As shown in FIG. 5, each of the hubs 150H has a trunnion shaft 160 secured therein and projecting outwardly therefrom. Each of the trunnion shafts 160 extends into a respective eccentric trunnion bushing housing 160H. The eccentric trunnion bushing 160H has a non-uniform radial wall thickness. For example, the radial thickness W1 of one portion of the eccentric trunnion bushing housing 160H is less than the radial thickness W2 of another portion of the eccentric trunnion bushing housing 160H. The trunnion bushing housing 160H has a flange 160F extending radially outward from an outboard end thereof. The flange 160F is adjustably secured to the portion 100E of the grinding mill 100, by a plurality of fasteners 90B (e.g., bolts) that are each threaded into respective female threaded bores formed in the portion 100E of the grinding mill 100. A trunnion bushing 160B is positioned in the trunnion bushing housing 160H. The shaft 160 is rotatably positioned in the trunnion bushing 160B. During operation of the grinding mill 100, the trunnion shaft 160 rotates in an oscillatory manner (e.g., dithering) due to vibratory motion of the grinding roller 118 (shown in FIGS. 2 and 4) that is transmitted to the trunnion shaft 160 through the journal 120 and the journal head 150.

As shown in FIGS. 4 and 5, a lever arm 170 extends between a flange mounting end 170F and a door mounting end 170D thereof. A tab 170T extends upwardly from the lever arm 170 at a predetermined pivot point located between the flange mounting end 170F and the door mounting end 170D. The flange mounting end 170F includes a circular opening 170Z therein. An axial extension 160AE of the flange 160F extends into the circular opening 170Z. The flange mounting end 170F is secured to the flange 160F by a plurality of second fasteners 90A. As shown in FIG. 1, the door mounting end 170D is secured to the upper door assembly 20 via a door mounting bracket 20M and a connector sleeve 170C. The lever 170 is releasably secured to the flange 160F by the plurality of second fasteners 90A, and when the plurality of second fasteners 90A are removed, the lever 170 is in rotational sliding engagement relative to the flange 160F, which enables the upper door assembly 20 to pivot towards or away from the mill 100. When the upper door assembly 20 is pivoted towards or away from the mill 100, there is rotational sliding engagement between the circular opening 170Z and a circumferential surface 160Z of the axial extension 160AE. When the upper door assembly 20 is pivoted towards or away from the mill 100, the lever arm 170 rotates in an arc relative to the axial extension 160AE due to a force applied by an actuator 180 (e.g., a linear actuator, a piston cylinder arrangement or the like), as described further herein. When the upper door assembly 20 is in a maximum open position, the journal 120 is substantially vertical.

As shown in FIGS. 4 and 5, the lever arm 170 is configured to rotate the eccentric trunnion bushing housing 160H to change a position of the longitudinal axis L of the journal head 150 and the grinding roller 118 rotatably secured thereto via the journal 120. The flange 160F is adjustably secured to the portion 100E of the grinding mill 100 by the plurality of first fasteners 90B. When the upper door assembly 20 is closed and when the plurality of fasteners 90B are removed, the trunnion bushing housing 160H is rotatable with respect to the portion 100E of the grinding mill 100, via the operation of an actuator 180, to change a position of the longitudinal axis L of the journal head 150 and the grinding roller 118. When the position of the longitudinal axis L of the journal head 150 and the grinding roller 118 is being adjusted, there is rotational sliding between an inside circumferential surface 160Y of the portion 100E of the grinding mill 100 and an exterior circumferential surface 160X of the trunnion bushing housing 160H.

As shown in FIGS. 1 and 4, the actuator 180 extends from an upper end 180U to a lower end 180L thereof. The upper end 180U is pivotally connected to the mill wall 100W at a position above the upper door assembly 20, and the lower end 180L is pivotally connected to the tab 170T extending from the lever arm 170. As shown in FIG. 4, the actuator 180 includes a piston rod 180P that is extendable in and out of an actuator cylinder 180C. A hydraulic fluid is selectively supplied to the actuator cylinder 180C to effectuate movement of the piston rod 180P in the actuator cylinder 180C. The actuator 180 is configured to move the lever arm 170 in an arc to open and close the upper door assembly 20 and to change a position of the longitudinal axis L of the journal head 150 and the grinding roller 118 that is rotatably secured thereto via the journal 120.

While the present disclosure has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A split door assembly for a grinding mill, the split door assembly comprising:

an upper door assembly comprising an upper door exterior surface, the upper door exterior surface being configured to support a journal actuator assembly and the upper door assembly being configured to pivot with a journal having a grinding roller mounted thereon;

a lower door positioned below the upper door assembly; and a hinge assembly pivotally connected to the upper door assembly on the upper door exterior surface and connected to the lower door on a lower door exterior surface, wherein the upper door assembly and the lower door are pivotable together between a closed position and an open position, wherein when in the closed position, the upper door assembly abuts the lower door, and wherein when in the open position, the upper door assembly is pivoted away from the grinding mill, the lower door is pivoted away from the grinding mill and the lower door is pivoted relative to the upper door assembly.

2. The split door assembly of claim 1, wherein the hinge assembly comprises:

a linkage arm extending from a first pivotal connector to a mounting portion that is secured to the lower door; and an upper door bracket secured to the upper door assembly and having a second pivotal connector extending outwardly therefrom, wherein the first pivotal connector is configured to pivot with the second pivotal connector at a pivot axis.

3. The split door assembly of claim 2, further comprising a pin extending through the first pivotal connector and the second pivotal connector such that the first pivotal connector is pivotally connected to the second pivotal connector at the pivot axis.

4. The split door assembly of claim 2, further comprising:

a shoulder extending from the first pivotal connector; and a locking plate secured to at least one of the first pivotal connector and the second pivotal connector, a lateral edge of the locking plate abuts the shoulder, and the locking plate selectively controls a position of the linkage arm relative to the second pivotal connector.

5. The split door assembly of claim 4, wherein when the locking plate is removed, the lower door and the bracket are configured to pivot out until a combined center of gravity of the lower door and the bracket is vertically aligned with the pivot axis.

6. The split door assembly of claim 4, wherein when the locking plate is removed, a portion of the first pivotal connector is configured to engage the upper door bracket to limit pivoting of the lower door so that the lower door is prevented from engaging a trunnion cylinder secured to the upper door exterior surface.

7. The split door assembly of claim 1, further comprising:

a journal head pivotally connected to a portion of the grinding mill, the journal head comprising a shaft receiving hub aligned along a longitudinal axis thereof, and a trunnion shaft secured in the hub and projecting outwardly therefrom and into an eccentric trunnion bushing housing, wherein the trunnion bushing housing has a flange extending radially outward from an outboard end thereof, the flange is adjustably secured to the portion of the grinding mill, a trunnion bushing is positioned in the trunnion bushing housing and the shaft is rotatably positioned in the trunnion bushing; and a lever arm extending between a flange mounting end and a door mounting end thereof, wherein a tab extends upwardly from the lever arm between the flange mounting end and the door mounting end, the flange mounting end is secured to the flange, the door mounting end is secured to the upper door assembly, the lever arm is configured to open and close the upper door assembly and the lower door while the journal head and the grinding roller are secured to the upper door assembly.

8. The split door assembly of claim 7, further comprising:

an actuator extending from an upper end to a lower end thereof, the upper end being pivotally connected to a mill wall located at a position above the upper door assembly and the lower end being pivotally connected to the tab; and the actuator being configured to move the lever arm to open and close the upper door assembly and the lower door.

9. The split door assembly of claim 7, further comprising a plurality of first fasteners configured to secure the flange to the portion of the grinding mill, and wherein when the plurality of first fasteners are removed, the trunnion bushing housing is rotatable with respect to the portion of the grinding mill to change a position of the longitudinal axis of the journal head and the grinding roller.

10. The split door assembly of claim 7, further comprising a plurality of second fasteners configured to secure the lever arm to the flange, and wherein when the plurality of second fasteners are removed, the lever arm is in rotational sliding engagement with the flange to enable the upper door assembly to pivot towards or away from the mill.

11. The split door assembly of claim 1, wherein when the upper door assembly is in a maximum open position, the journal is substantially vertical.

12. The split door assembly of claim 1, wherein in the open position, the lower door is configured to swing away from the upper door assembly, such that the upper door assembly and the lower door are positioned below the journal.

13. A mill door opening mechanism for a grinding mill, the door opening mechanism comprising:

a door assembly configured to pivot with a journal having a grinding roller in communication therewith, the door assembly configured to be split into an upper door assembly and a lower door, the upper door assembly pivotal with the journal with the grinding roller mounted thereon;

the journal is fixed to a journal head which is pivotally connected to a portion of the grinding mill, the journal head comprising a shaft receiving hub aligned along a longitudinal axis thereof, a trunnion shaft is mounted in the hub and projects outwardly therefrom and into an eccentric trunnion bushing housing, wherein the trunnion bushing housing has a flange extending radially outward from an outboard end thereof, the flange is adjustably secured to the portion of the grinding mill, a lever arm fixed to the flange; and an actuator connected between the lever arm and a mill wall of the grinding mill, the actuator is configured to pivot the upper door assembly and the lower door together about the longitudinal axis and between a closed position and an open position.

14. A grinding roller adjustment mechanism for a grinding mill, the grinding roller adjustment mechanism comprising:

an upper door assembly pivotally arranged to the grinding mill, a journal having a grinding roller mounted thereon, the journal is fixed to a journal head pivotally connected to a portion of the grinding mill, the journal head comprising a shaft receiving hub aligned along a longitudinal axis thereof, and a trunnion shaft mounted in the hub and projecting outwardly therefrom and into an eccentric trunnion bushing housing, wherein the trunnion bushing housing has a flange extending radially outward from an outboard end thereof, the flange is adjustably secured to the portion of the grinding mill, a lever arm fixed to the flange; and an actuator connected between the lever arm and a mill wall of the grinding mill, the actuator is configured to rotate the trunnion bushing housing to thereby change the position of the longitudinal axis while the upper door assembly is closed, to control the location of the grinding roller relative to a grinding ring disposed in the grinding mill.

* * * * *